Patented May 1, 1951

2,550,702

UNITED STATES PATENT OFFICE 2,550,702

17-KETOSTEROID MERCAPTOLS

Robert H. Levin, Kalamazoo, Mich., assignor to The Upjohn Company, Kalamazoo, Mich., a corporation of Michigan No Drawing. Application May 29, 1948, Serial No. 30,200

4 Claims. (Cl. 260—397.1)

The present invention relates to the condensation of 17-ketosteroids with monothiols and is further concerned with the products produced thereby.

It is an object of the present invention to provide a method for the condensation of monothiols with 17-ketosteroids. An additional object of the invention is to prepare novel 17-ketosteroid mercaptols. Other objects of the invention will become apparent hereinafter.

The 17-mercaptols of the present invention are useful intermediates in that the original 17-carbonyl group is "protected" by removal as an active center during further transformations, but yet may be regenerated by acid hydrolysis. Moreover, since reduction of these mercaptols replaces the mercaptol linkages with hydrogen, a procedure alternative to the Wolf-Kishner reduction is available for transforming a carbonyl group into a $CH_2$ group. That mercaptols could be prepared from monothiols and 17-ketosteroids is indeed surprising and unexpected, as it has already been reported in the literature that monothiols do not react with a carbonyl group in the 17 position of a steroid compound.

The process of the invention is conducted by mixing a 17-ketosteroid in the presence of anhydrous zinc chloride and anhydrous sodium sulfate with from two to twenty moles of the monothiol per mole of ketosteroid, with or without the presence of an inert organic solvent. Preferably at least ten moles of monothiol is used for each mole of ketosteroid. The reactants are conveniently mixed at room temperature or lower, and the mixture thereafter cooled to between zero and ten degrees centigrade and maintained at such temperature for about five to twenty hours, preferably for a period of at least ten hours. After completion of the reaction period, the mixture of reaction products may conveniently be allowed to warm to room temperature and recovered by pouring into water. The product may be isolated from the water by filtration or by extraction with a suitable solvent such as ether or chloroform, the extract washed, dried, solvent removed, and the residue crystallized from a solvent such as hexane, ethyl acetate, or aqueous acetone. Other modes of separation and isolation may be used and will be apparent to one familiar with the art.

The monothiol employed in the process of the present invention may be any such compound not containing in the molecule another functional group which is reactive with a carbonyl group. Representative monothiols may be, for example, alkyl or aryl mercaptans such as ethyl mercaptan, propyl mercaptan, butyl mercaptan, amyl mercaptan, 1-mercapto-2-methylpropane, thiophenol, benzyl mercaptan, and the like. Monothiol acids such as thioglycollic and i-propanthiol acid (HSCHMeCOOH) may also be used and are suitable monothiol starting materials.

As the steroid starting material may be used any 17-ketosteroid, such as equilenin, isoequilenin, equilin, estrone, androstenediones, androstanedione, dehydroandrosterones, androsterones, acyl and alkoxy derivatives of the foregoing hydroxy-containing steroid compounds, and the like. Preferred starting materials in one embodiment of the invention are the androsterones. Double bonds or hydroxyl groups which may be present in the steroid molecule have been found not to interfere with condensation of the monothiol and the 17-keto group, but the carbonyl group or groups when present in other than the 17 position of the steroid nucleus may also be converted into a mercaptol group.

The following examples are given to illustrate the present invention but are not to be construed as limiting:

*Example 1.—Delta 5-dehydroandrosterone 17-dibenzyl mercaptol*

To a mixture of 2.8 grams of freshly fused and pulverized zinc chloride, 5.0 grams of anhydrous sodium sulfate and 2.88 grams (0.01 mole) of delta 5-dehydroandrosterone was added 25 milliliters (0.21 mole) of benzyl mercaptan. After standing at room temperature for fifteen minutes, the mixture was placed in a refrigerator for twenty hours, then allowed to warm up to room temperature and poured into 500 milliliters of ice water. The mixture was extracted with three 125-milliliter portions of ether, the combined ether extracts washed with five percent sodium hydroxide solution, then with water, and dried. The ether and excess benzyl mercaptan were recovered by distillation under reduced pressure. The residue, after crystallization from hexane, yielded 3.36 grams of delta 5-dehydroandrosterone 17-dibenzyl mercaptol, melting at 184–186 degrees centigrade.

*Example 2.—Delta 5-dehydroandrosterone acetate 17-dibenzyl mercaptol*

One gram of detal 5-dehydroandrosterone 17-dibenzyl mercaptol, 5 milliliters of acetic anhydride, and 10 milliliters of pyridine were mixed and allowed to stand at room temperature for 20 hours. The reaction mixture was then poured into 300 milliliters of water and the water suspension extracted with three 100-milliliter portions of ether. After washing the combined ether extracts with 100 milliliters of five percent sodium hydroxide solution, 100 milliliters of hydrochloric acid and 150 milliliters of water, the ether solution was dried and the ether removed. The residue was dissolved in fifty milliliters of hot acetone and water added until the solution became cloudy. After standing overnight at about five degrees centigrade, 1.2 grams of delta 5-dehydroandrosterone acetate 17-dibenzyl mercaptol, melting at 150–152 degrees centigrade, was obtained.

*Example 3.—Delta 5-dehydroandrosterone 17-thioglycollic acid mercaptol*

To a mixture of 2.8 grams of freshly fused and pulverized zinc chloride, 5.0 grams of sodium sulfate and 2.88 grams (0.01 mole) of delta 5-dehydroandrosterone, was added 10.0 grams (0.11 mole) of thioglycollic acid. After standing at room temperature for fifteen minutes, the mixture was placed in a refrigerator for twenty hours, then removed and allowed to warm to room temperature. The reaction mixture was then poured into 500 milliliters of water, whereafter the precipitate which separated was removed by filtration. After crystallization from acetone-water and ethyl acetate, delta 5-dehydroandrosterone 17-thioglycollic acid mercaptol, melting at 177–179 degrees centigrade, was obtained.

It is to be understood that this invention is not to be limited to the exact methods and compositions hereinbefore described, since obvious modifications will occur to a person skilled in the art in accordance with the principles declared herein.

I claim:

1. A delta 5-dehydroandrosterone 17-mercaptol having in the 17-position the mercaptol group $$\begin{array}{c} S-R \\ \diagup \\ \diagdown \\ S-R \end{array}$$

wherein R is a member of the group consisting of (a) hydrocarbon radicals containing up to 7 carbon atoms, inclusive, and (b) hydrocarbon radicals containing up to 3 carbon atoms, inclusive, which carry a carboxyl group as sole substituent, both R groups being the same.

2. Delta 5-dehydroandrosterone 17-dibenzyl mercaptol.

3. Delta 5-dehydroandrosterone 17-thioglycollic acid mercaptol.

4. Delta 5-dehydroandrosterone acetate 17-dibenzyl mercaptol.

ROBERT H. LEVIN.

REFERENCES CITED

The following references are of record in the file of this patent:

UNITED STATES PATENTS

| Number | Name | Date |
|---|---|---|
| 2,453,566 | Bernstein | Nov. 9, 1948 |